(12) United States Patent
Melax et al.

(10) Patent No.: US 9,142,022 B2
(45) Date of Patent: Sep. 22, 2015

(54) 3D OBJECT TRACKING

(71) Applicant: INTEL CORPORATION, Santa Clara, CA (US)

(72) Inventors: Stanley K. Melax, Los Gatos, CA (US); Sterling G. Orsten, Santa Clara, CA (US); Leonid M. Keselman, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 69 days.

(21) Appl. No.: 14/052,118

(22) Filed: Oct. 11, 2013

(65) Prior Publication Data

US 2015/0104096 A1    Apr. 16, 2015

(51) Int. Cl.
*G06K 9/00* (2006.01)
*G06T 7/00* (2006.01)
*G06T 7/20* (2006.01)

(52) U.S. Cl.
CPC ............ *G06T 7/004* (2013.01); *G06K 9/00375* (2013.01); *G06T 7/20* (2013.01); *G06T 2207/10012* (2013.01); *G06T 2207/30196* (2013.01)

(58) Field of Classification Search
CPC ..... G06F 3/00; G06F 3/04815; G06F 3/0482; G06F 17/50; G06F 17/5086; G06T 7/0022; G06T 7/0028; G06T 7/0071; G06T 7/0075; G06T 11/20; G06T 13/20; G06T 13/40; G06T 15/10; G06T 17/00; G06T 17/10; G06T 17/20; G06T 17/30; G06T 17/80; G06T 19/00; G06T 19/30; G06T 2200/08; G06T 2207/10021; G06T 2210/41; G06T 2213/04; G06K 9/00369; B25J 9/1605
See application file for complete search history.

(56) References Cited

U.S. PATENT DOCUMENTS 5,835,693 A * 11/1998 Lynch et al. .................. 345/473
7,286,127 B2 * 10/2007 Zhou et al. .................... 345/420
(Continued)

FOREIGN PATENT DOCUMENTS

JP         2005-091085 A      4/2005
KR     10-2010-0104228 A      9/2010

OTHER PUBLICATIONS

International Search Report and Written Opinion mailed Dec. 23, 2014 for International Application No. PCT/US2014/054807, 11 pages.
(Continued)

*Primary Examiner* — Jose Couso
(74) *Attorney, Agent, or Firm* — Schwabe, Williamson & Wyatt, P.C.

(57) ABSTRACT

Embodiments relate to tracking a pose of a 3D object. In embodiments, a 3D computer model, consisting of geometry and joints, matching the 3D real-world object may be used for the tracking process. Processing the 3D model may be done using collision constraints generated from interpenetrating geometry detected in the 3D model, and by angular motion constraints generated by the joints describing the connections between pieces/segments/bones of the model. The depth data in its 3D (point cloud) form, supplied by a depth camera, may be used to create additional constraints on the surface of the 3D model thus limiting its motion. Combined together, all the constraints, using linear equation processing, may be satisfied to determine a plausible pose of the 3D model that matches the real-world pose of the object in front of the 3D camera.

18 Claims, 6 Drawing Sheets

(56) References Cited

U.S. PATENT DOCUMENTS

| | | | |
|---|---|---|---|
| 7,333,111 B2* | 2/2008 | Ng-Thow-Hing et al. | ... 345/473 |
| 2008/0071507 A1 | 3/2008 | Hodgins et al. | |
| 2012/0218262 A1 | 8/2012 | Yomdin et al. | |
| 2013/0034203 A1* | 2/2013 | Wang et al. | ..................... 378/41 |
| 2014/0163731 A1* | 6/2014 | Shi et al. | ....................... 700/250 |

OTHER PUBLICATIONS

Stan Melax et al., "Dynamics Based 3D Skeletal Hand Tracking", In: Proceedings gs of Graphics Interface 2013, Canada, May 29-31, 2013, pp. 63-70 ("http://dl.acm.org/citation.cfm?id=2532141").

"Intel@CES 2013—Intel Haswell, Ivy Bridge 7W, Clover Trail +, Lexington, Bay Trail . . . " http://www.youtube.com/watch?v=ogneimca9ko; Oct. 11, 2013, 3 pages.

GI 2013: Advance Program; Graphics Interface 2013, May 29 to 31, Regina Saskatchewan, Canada, 4 pages (http://pages.cpsc.ucalgary.ca/~samavati/gi2013/program.html[Oct. 11, 2013 9:56:44 AM]).

Andrew Witkin et al.,"Physical Based Modeling: Principles and Practice (Online Siggraph '97 Course notes)", Oct. 11, 2013, 338 pages (http://www.cs.cmu.edu/~baraff/sigcourse/[Oct. 11, 2013 10:12:01 AM]).

Andrew Witkin et al., Physical Based Modeling: Principles and Practice (Online Siggraph '97 Course notes), Oct. 11, 2013, 1 page (http://www.cs.cmu.edu/~baraff/sigcourse/[Oct. 11, 2013 10:12:01 AM]).

* cited by examiner

3D OBJECT TRACKING

FIELD

Embodiments of the present invention relate generally to the technical field of data processing, and more particularly, to tracking an object in three-dimensional (3D) space.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Natural human computer interaction motivates object tracking, and specifically hand tracking research. Tracking the full pose of the hands and fingers of a user is a challenging problem, and may have a plethora of applications for user-machine interaction. Existing techniques may require wearable hardware, add restrictions to user pose, or require significant computation resources.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments herein may describe an approach to tracking a 3D object such as a user's hand or some other articulated model, by using an augmented rigid body simulation. The motion constraints enforced on a 3D model representing the 3D object may be phrased as a linear complementarity problem with a well-defined solution. That is, one or more linear equations may represent the allowable motion of the 3D model. The pose, or specific orientation, of the bones of the 3D model may be based on the solution to the one or more linear equations. Based on a depth sensor's samples of the 3D object, the system may generate surface constraints that, along with one or more other factors or constraints such as prior motion, collision/contact constraints, and joint mechanics, may constrain the solution. In some embodiments, additional or alternative 3D models having different poses may be generated based on different heuristics and hypotheses, and then a 3D model from the different 3D models may be selected based on one or more error metrics.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
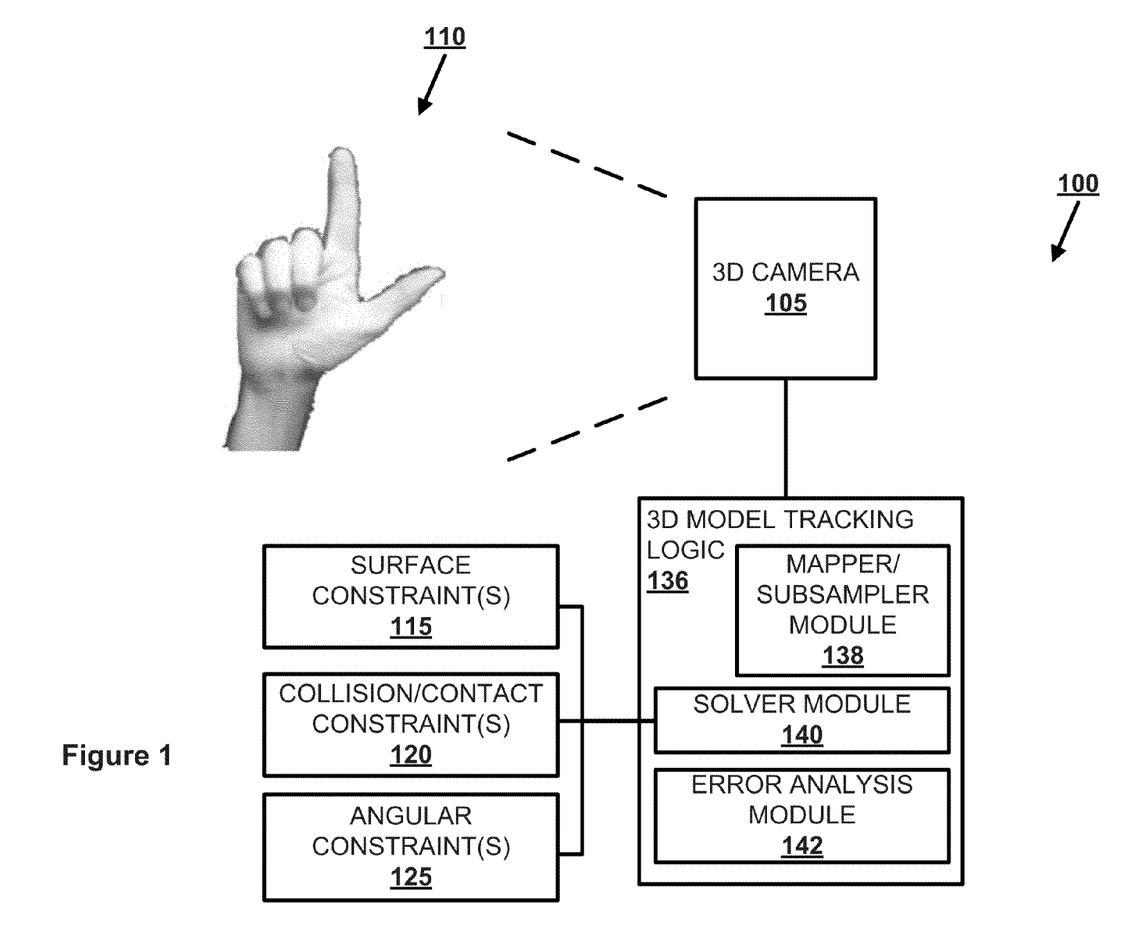
FIG. 1 depicts an example system for determining pose of a 3D model from a 3D image, in accordance with various embodiments.

FIG. 1 depicts an example system 100 for determining pose of an object in a 3D image that may be used in accordance with various embodiments herein. Specifically, a 3D camera 105 may be configured to capture an image of a 3D object 110 such as a user's hand. In embodiments, the 3D camera 105 may be a stereoscopic camera, a structured light camera, a time-of-flight camera, a projected texture stereoscopic camera, or some other type of 3D camera 105. The 3D object 110 may be positioned, for example, between approximately 30 centimeters and one meter from the 3D camera.

The 3D camera 105 may be coupled with 3D model logic 136. The 3D model logic 136 may have a mapper/subsampler module 138 configured to create a point cloud mapping of the 3D object 110, as described in further detail below. The 3D model logic 136 may additional include a solver module 140 configured to find a solution to one or more linear equations that represent a 3D model of the 3D object 110, as described in further detail below. Additionally, the 3D model logic 136 may include an error analysis module 142 configured to determine an error metric related to a solution generated by the solver module 140. In some embodiments the solver module 140 may be able to generate or access one or more surface constraint(s) 115, one or more collision/contact constraint(s) 120, and/or one or more angular constraint(s) 125 which may constrain one or more of the solutions generated by the solver module 140.

In some embodiments, some or all of the 3D model logic 136 may be elements of the 3D camera 105. In some embodiments, some or all of the 3D model logic 136 may be elements of a computing system coupled with the 3D camera 105. The 3D model logic 136 may be implemented as hardware, software, and/or firmware. In some embodiments, some or all of the surface constraint(s) 115, collision/contact constraint(s) 120, and/or angular constraint(s) 125 may be logical elements of the 3D model logic 136, or may be stored on or generated by the 3D camera 105 or a separate computing system and/or server coupled with the 3D camera 105 and/or 3D model logic 136.

Figure 2:
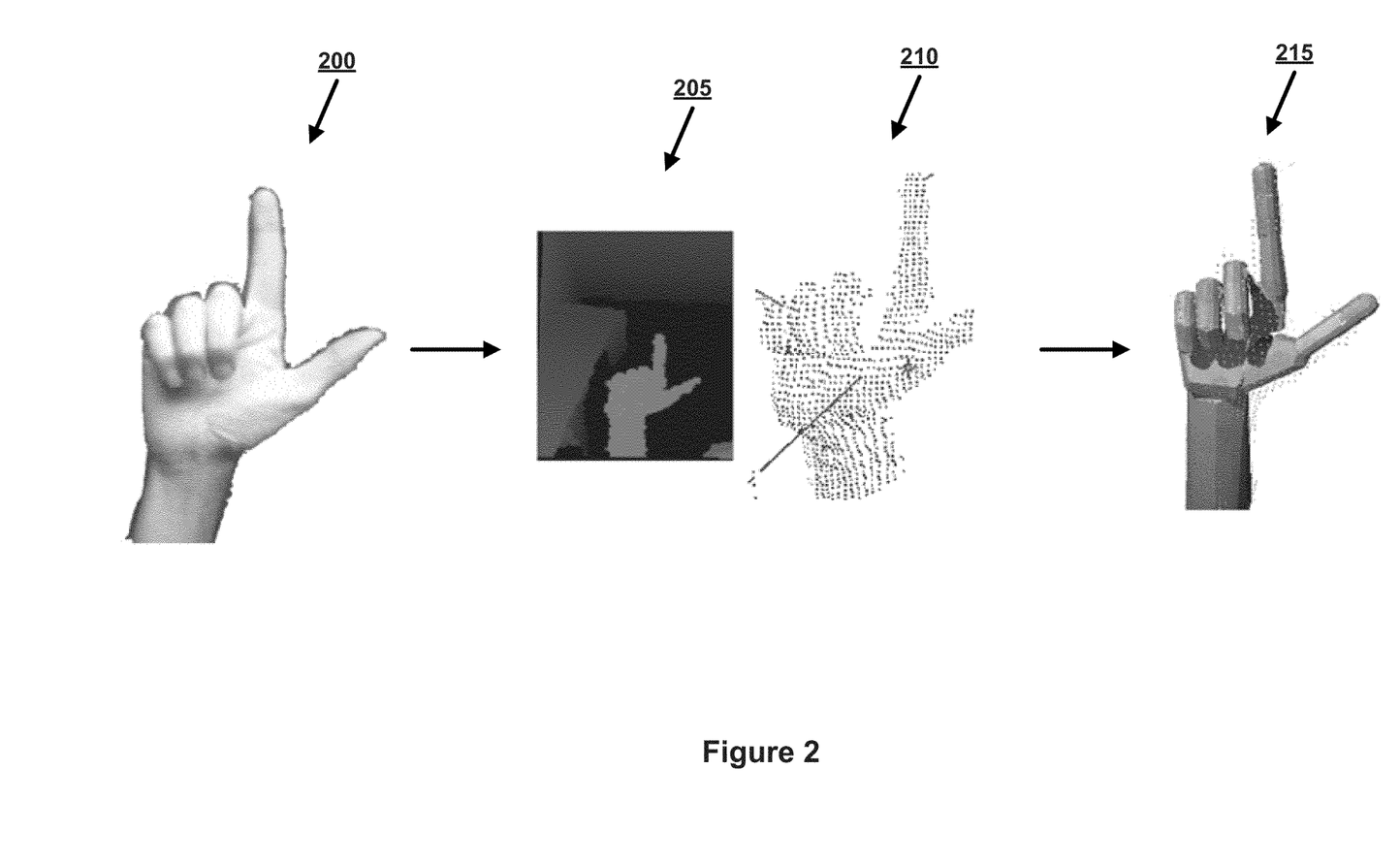
FIG. 2 is an example of fitting a 3D model of a 3D object to depth data, in accordance with various embodiments.

FIG. 2 depicts an example of fitting a pose of a 3D model 215 of a 3D object 200 to depth data of the 3D object 200, for example using the system 100 of FIG. 1, in accordance with various embodiments. In embodiments, the 3D object 200 may be similar to 3D model 110 described above. Initially, the 3D object 200 such as a hand may be in a specific pose. In FIG. 2, the hand is shown with the index finger and thumb extended. Although a hand is used herein as an example, the 3D object 200 may be some other object in other embodiments. The 3D object 200 may be movable, for example the 3D object 200 may be configured to be articulated, manipulated, translated, or rotated. In embodiments the 3D object 200 may perform a motion such as a grasping or waving motion, or the 3D object 200 may perform or be subjected to some other type of movement.

A 3D image 205 of the object may be taken, for example by a 3D camera such as 3D camera 105 described above. The 3D image 205 may be mapped to generate one or more point cloud mappings 210 of the 3D object 200. In embodiments, the point cloud mapping 210 of the 3D object 200 may be performed by mapper/subsampler module 138 described above. In some embodiments, a 3D camera may be configured to generate a point could mapping 210 without the intermediate step of capturing a 3D image 205.

In some cases, the point cloud mapping 210 may be subsampled, and further subsampled point cloud maps may be generated (not shown), for example by the mapper/subsampler module 138 described above. For example, the point cloud samples may initially be nonuniform. That is, certain portions of the point cloud mapping 210 may have a very large number of points, while other portions of the point cloud mapping 110 may only have a low number of points.

However, the point cloud maps may be subsampled onto a 3D volume element (voxel) grid. Specifically, the point cloud mapping 210 may be divided up into a plurality of 3D elements (voxels) in a grid-like mapping. For each voxel, a single point in the point cloud mapping may be generated at the center-of-mass of the points within the voxel. Therefore, voxel subsampling may produce a subsampled point cloud mapping with uniform spatial sampling across the surface of the 3D object. As the voxel size increases, the number of voxels used to represent a given volume may decrease, and the data set may become sparser which may result in an increase in the overall speed of tracking (e.g., the tracking may be performed at a higher frame rate). Additionally, by subsampling the point cloud mapping, erroneous points in the point cloud mapping may be discarded.

Finally, a 3D model 215 of the 3D object 200 may be constructed based at least in part on the point cloud mapping 210. The pose of the 3D model 215 may be based at least in part on the solution of the one or more linear equations that are constrained by one or more surface constraints, as described in further detail below. In embodiments, the solution may be determined by solver module 140 described above.

The 3D model 215 may be a pre-constructed model, or the 3D model 215 may be constructed in response to data obtained from the 3D. In embodiments, the 3D model 215 may include a plurality of segments. In embodiments, the segments may apply to various ways of representing different 3D models including convex meshes, capsules, or other ways of representing a 3D model. In the 3D model 215, the model of the human hand may include 17 segments (i.e. bones). For example, the model may include three bones for each finger, a single bone to represent the palm, and a single bone for the wrist. The bones may be connected at joints, and constrained in their angular motion to physically possible configurations, as described below. In the 3D model 215, the model of the hand may have a size of roughly 20 centimeters, though in other embodiments the 3D model 215 may be scalable to fit any hand size. Additionally, the hand may be modifiable to conform to a user with, for example, a missing digit or double jointed flexibility. In some embodiments, the bones of the fingers may be roughly capsule shaped, and included rounded caps which may occupy the same space as a neighboring finger bone. Additionally, collision detection between some neighboring shapes in the 3D model 215 may be disabled. This may allow the bones of the fingers to remain generally attached to one another.

The motion of the 3D object 200 may be tracked over time based on methods of rigid body physics. In particular, the tracking problem may be posed as a constrained set of linear equations, and solved by a solver module such as solver module 140 using a method such as a Projected Gauss-Seidel iterative method. The set of linear equations may include one or more constraints which may be obtained from physical models of a real articulated hand, and include one or more angular constraints, one or more collision constraints, and one or more surface constraints, as described in further detail below. Specifically, the surface constraint(s) may behave in a magnet-like manner which may be impulse capped so that the mapping is just enough to move the intact hand during rapid motion, but not so much that unnatural simulations may result (e.g., separation of joints or unphysical joint angles). The tracking model may assume a correct initial fit to the user's hand, and may rely on prior simulated hand states over subsequent frames (i.e., temporal coherence) to aid in tracking accuracy. The temporal coherence may be necessary due to the presence of one or more of measurement errors, camera occlusions, and pose ambiguities.

Figure 3:
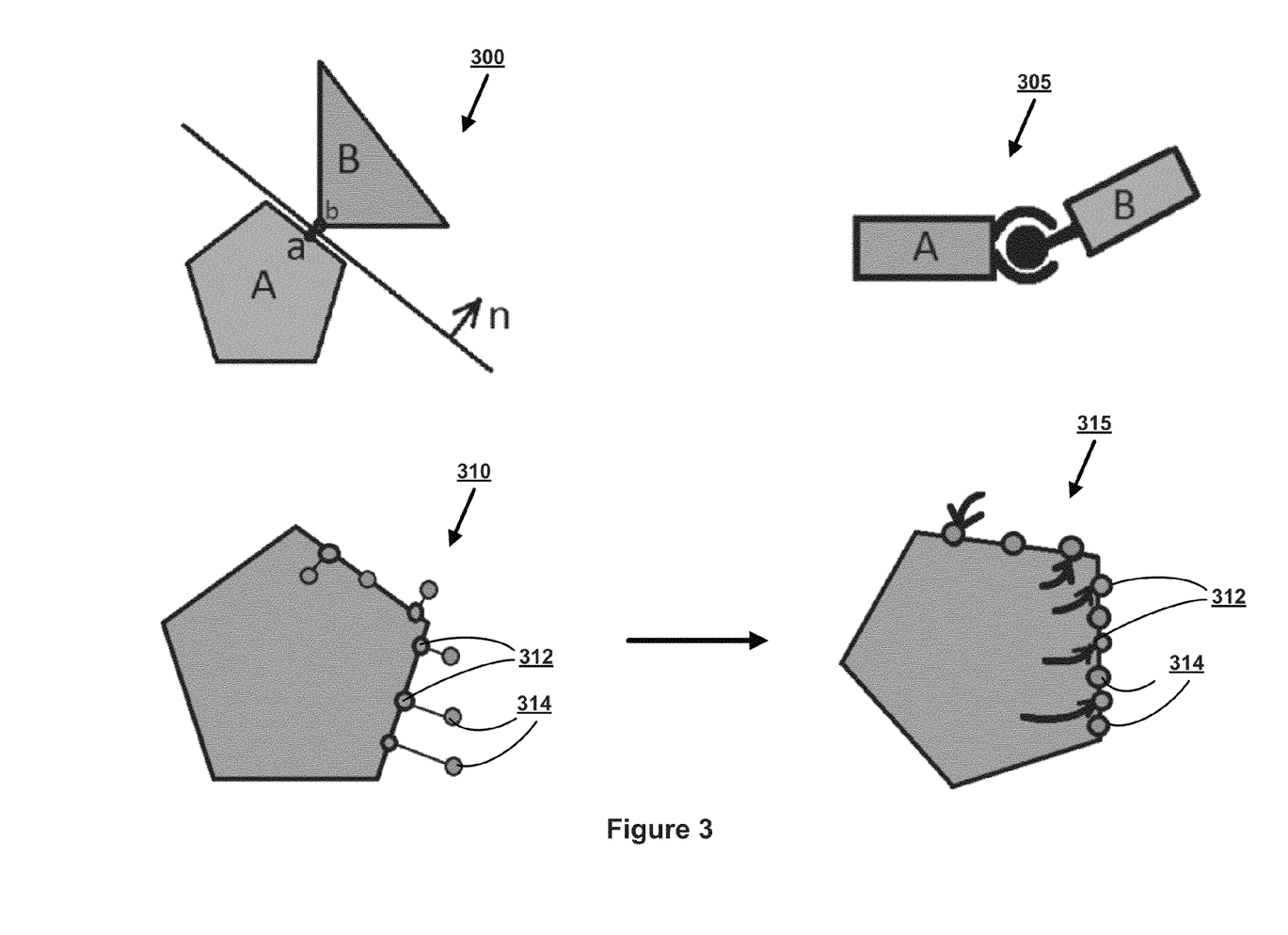
FIG. 3 depicts various examples of constraints of a pose of a 3D model of an object, in accordance with various embodiments.

FIG. 3 depicts a plurality of constraints of a pose of a 3D model of an object. Specifically, the constraints, when expressed as linear equations, may provide a solution for the pose of the 3D model that may match the 3D object captured by a 3D camera. A first constraint may be one or more collision/contact constraint(s) 300, which may be similar to the collision/contact constraint(s) 115 described above. The collision/contact constraint(s) 300 may refer to how the 3D model 215 should handle collisions between different bodies. For example, interpenetration at a contact point may not occur in most objects (e.g., finger to finger, finger to a solid structure like a wall, etc.). This interpenetration may be avoided by ensuring a positive (i.e., separating) velocity along the normal of impact of point a on object A relative to the corresponding point b on the object B, as shown in FIG. 3. Therefore, the collision/contact constraint(s) 300 may be used to constrain the solution representing the pose of the 3D model 215 so that one or more "solid" elements of the 3D model 215 such as a first finger does not interpenetrate, or go through, one or more other "solid" elements of the 3D model 215 such as a second finger in a given pose of the 3D model 215.

Another constraint may be one or more angular constraint(s) 305. The angular constraint(s) 305 may relate to limits of different joints of the 3D object 200. Specifically, the angular constraint(s) 305 may constrain the solution representing the pose of the 3D model 215 so that that one or more elements of the 3D model 215 are not positioned in a way that would be unlikely or impossible for the 3D object 200 in a given pose. For example, a joint in a hand may only have a certain range of motion, and it may not be physically possible for the joint to move beyond that range of motion. Therefore, the angular constraint(s) 305 may prevent joints from moving in unnatural ways in the 3D model 215. The angular constraints 305 may further serve to anchor the connection points between different neighboring bones.

A third constraint may be one or more surface constraint(s) as shown at 310 and 315. The surface constraint(s) may be used to constrain the solution representing the pose of the 3D model 215. In embodiments, the surface constraint(s) may be one or more constraints based on mapping the measured depth data to surface points on the 3D model 215. Specifically, the 3D image 205 or the one or more point cloud mappings 210 may provide a collection of measured points 314 indicating the geometry of the 3D object 200 from the point of view of the 3D camera. Each of these measured points 314 may be used as a magnet-like constraint to shift the pose of the 3D model 215 to more accurately correspond to the pose of the 3D object 200. In particular, the camera-facing surface of the 3D model 215 may be constrained to these measured points 314.

In embodiments, the pose of the 3D object 200 may be known based at least in part on the 3D image 205 or the point cloud mapping 210. However, the position of each of the measured points 314 on the 3D model 215, or even which segment of the 3D model 215 such as a finger, palm, etc., that the measured points 314 correspond to, may not be known. Therefore, a closest feature, such as a face of a segment of the 3D model 215, which in turn may include one or more model points 312, may be used for attachment. As noted above, the surface constraints may behave in a magnet-like fashion to move one or more segments or faces of the 3D model 215, or one or more model points 312 of the 3D model 215, to conform to the measured points 314. The attachment constraints may be one dimensional, as described below.

As an example and as shown in 310, the 3D model 215 may initially not conform to the 3D image 205 or the point cloud mapping 210. For example, the 3D model 215 may have one or more model points 312 at a first location, whereas the 3D image 205 and/or point cloud mapping 210 may indicate one or more measured points 314 at a second location. The one or more measured points 314 may act as "magnets" to the one or more model points 312. This magnetic effect may result in a rotation of one or more segments or faces of the 3D model 215 such that the one or more surface points 312 conform more closely to the one or more measured points 314, as shown at 315. As a result, the pose of the 3D model 315 may be altered so that the 3D model 315 more closely resembles the 3D object 200.

In some cases, it may not be possible to ensure that all of the measured points 314 are mapped to a correct spot on the 3D model 215. Therefore, the amount of impulse (e.g. force or torque applied to the 3D model 215) may be capped or limited. Specifically, the amount of impulse applied to rotate, translate, or otherwise move the 3D model 215 to conform to the 3D image 205 or the point cloud mapping 210 may be limited to have a maximum that is just strong enough to pull the 3D model 215 when the 3D object 200 is engaged in very fast motion such as a hand waving or fingers moving quickly. By contrast the collision/contact constraints and/or the angular constraints may not be impulse capped because under normal usage it may be assumed that the 3D object 200, and therefore the 3D model 215, will remain intact.

Figure 4:
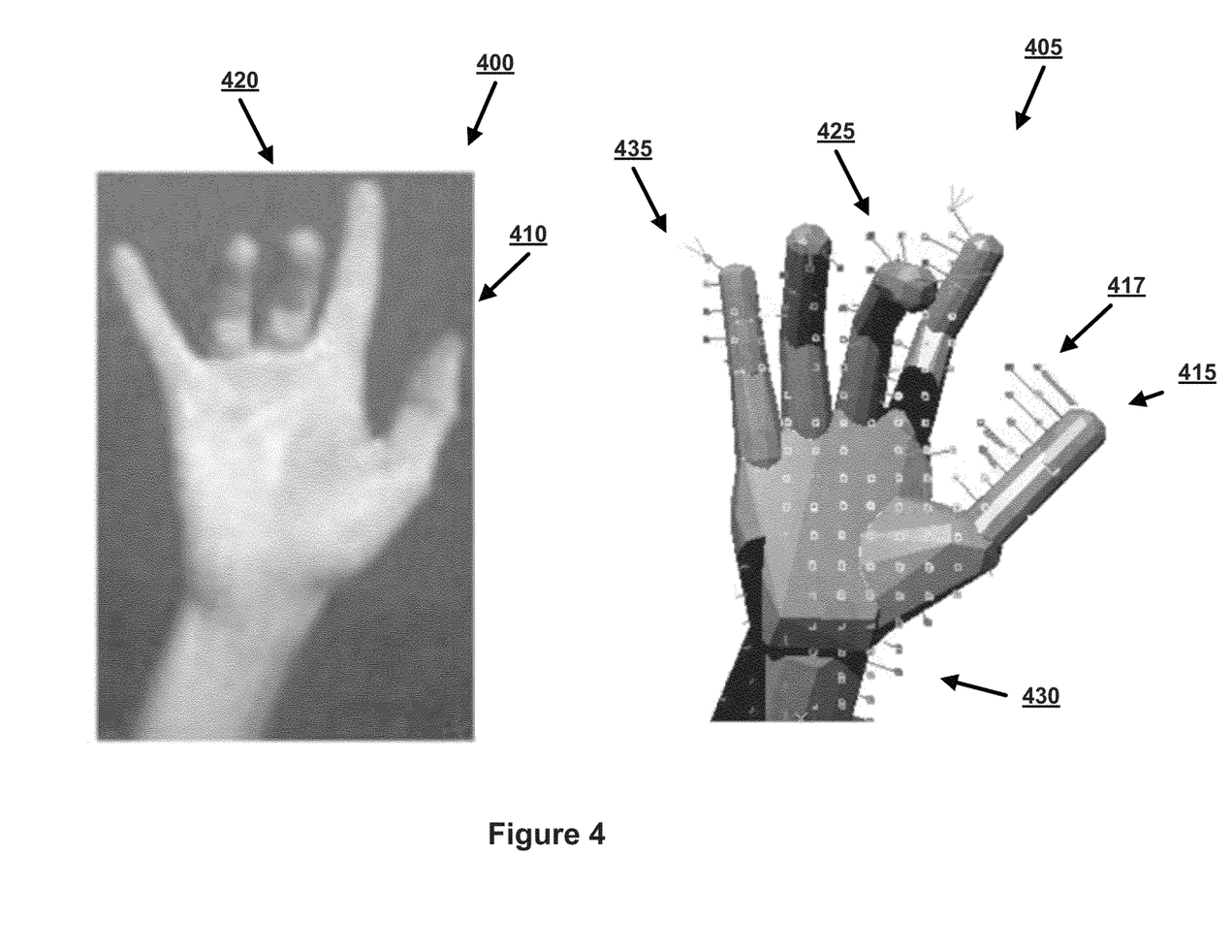
FIG. 4 depicts how surface constraints may affect a 3D model of a 3D object, in accordance with various embodiments.

FIG. 4 depicts an example of a surface constraint affecting a pose of a 3D model of a hand. A 3D image 400 of a hand, which may correspond to 3D images 110 or 200, is depicted with the fingers in a certain position. A 3D model 405, which may correspond to 3D model 215, intended to represent the 3D image 400 is shown with the fingers in a certain, different position. For example, in the 3D image 400, the user's thumb 410 is shown relatively close to the user's index finger. By contrast, the thumb 415 of the 3D model 405 is shown relatively further away from the index finger. A plurality of one-dimensional vectors 417 representing the surface constraints are shown that may act to adjust the thumb 415 in the 3D model 405 to more closely mirror the thumb 410 in the 3D image 400.

Similarly, the positions of the user's index and middle fingers 425 in the 3D model 405 are at a different position from the positions of the user's index and middle fingers 420 in the 3D image 400. A plurality of one-dimensional vectors representing the surface constraints are shown that may act to adjust the index and middle fingers 425 in the 3D model 405 to more closely mirror the index and middle fingers 420 in the 3D image 400. Similar vectors may be seen to adjust the position of the user's wrist 430 and the user's little finger 435.

Figure 5:
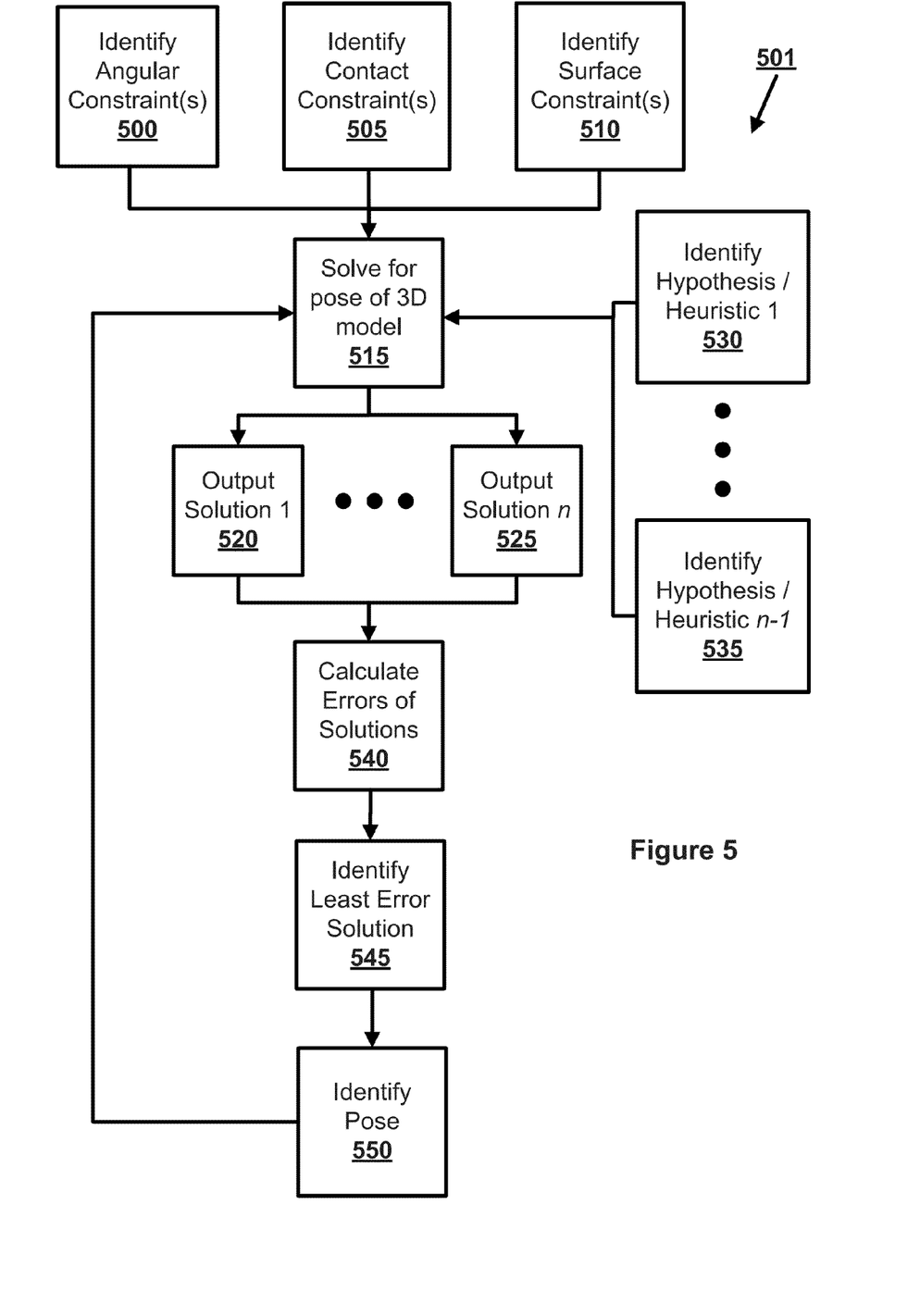
FIG. 5 schematically depicts an example computing device on which disclosed methods and computer-readable media may be implemented, in accordance with various embodiments.

FIG. 5 depicts an example of a process 501 which may be performed by a system such as system 100, or more specifically by the 3D model logic 136, to determine a pose of a 3D object such as 3D object 110 or 200, according to embodiments.

In embodiments, one or more angular constraints, collision/contact constraints, and surface constraints may be identified at 500, 505, and 510 respectively. The angular constraint(s) identified at 500 may correspond to the angular constraint(s) discussed above with respect to, for example, angular constraint(s) 125. The collision/contact constraint(s) identified at 505 may correspond to the collision/contact constraint(s) discussed above with respect to, for example, collision/contact constraint(s) 120. The surface constraint(s) identified at 510 may correspond to the surface constraint(s) discussed above with respect to, for example, surface constraint(s) 115.

One or more of the identification of the angular constraint(s), collision/contact constraint(s), and surface constraint(s) at 500, 505, and 510 may occur in parallel with one another, or sequential to one another. In embodiments, the identification of the angular constraint(s), collision/contact constraint(s), and surface constraint(s) at 500, 505, and 510 may be performed by a solver module such as the solver module 140 of the 3D model logic 136.

A solver module such as solver module 140 may then solve for the pose of the 3D model such as 3D model 215 of the 3D object such as 3D object 110 or 200 at 515. As noted above, the solver module may be a Gauss-Seidel iterative solver that is configured to determine a solution to a constrained set of one or more linear equations. As described above, one or more of the angular constraint(s), the collision/contact constraint(s), and the surface constraint(s) may be used to constrain the solution of the one or more linear equations. Additionally, as noted, the angular constraint(s) and/or the collision/contact constraint(s) may be based on one or more known properties of the 3D object that the 3D model is intended to represent. The surface constraint(s) may be based on a 3D image and/or point cloud mapping of the 3D object.

In some embodiments, the solver module may be configured to provide a plurality of solutions, each solution representing a different pose of a 3D model such as 3D model 215. For example the solver module may output solution 1 at 520 through solution n at 525. In some embodiments, n may be equal to five, meaning that the solver module may be configured to provide five different solutions to the constrained set of linear equations.

One or more of the solutions may be based on one or more starting hypotheses or heuristics. For example, if n is equal to five, then the solver module may accept as an input hypothesis/heuristic 1 at 530 through hypothesis/heuristic n−1 at 535. In other words, the solver module may provide at least one solution such as solution 1 at 520 that is not based on a starting hypothesis/heuristic. In some embodiments, n may be greater than or less than five. Additionally, the solver module may accept a greater or lesser number of hypothesis/heuristics, which may or may not directly correlate to the number of solutions that the solver module outputs. The number of solutions and hypotheses/heuristics are included herein as examples and the number of each is not intended to be limiting.

A first example of a hypothesis/heuristic that may be used by the solver module may include a gross motion bias. Specifically, hand motions may be very fast relative to the scale of the hand. In a single computer frame, a user's finger may move a distance that is greater than the width of the finger. In some instances, all of the fingers of a user's hand may be shifted one digit over when comparing a frame's 3D image to the 3D image of the previous frame. Therefore, a gross motion bias may simulate a movement wherein the entire hand may be first frozen into a single rigid body, thereby disallowing relative motion between different bones of the hands. The constraints of the solution aligning the palm and the wrist, along with the envelope of collision planes on the boundary, may overcome points in the point cloud that are mapped to an incorrect finger, and thereby result in moving the pose of the 3D model such as 3D model 215 closer to the pose of the 3D object such as 3D object 100. Then, the hand model may be unfrozen, the point cloud is re-mapped, and a regular simulation may take place to update any local movements in the 3D object (e.g., small movements of the fingers).

A second example of a hypothesis/heuristic may be a grasping bias. For example, a user may often move all of the fingers of their hand in unison, whether the fingers are all curled in a fist, laid out flat, or positioned somewhere in between those two extremes. Therefore, a second hypothesis/heuristic may constrain the movement of the fingers such that one or more of the bones of the finger are constrained to be within roughly ten degrees of parallel of bones of another finger in the hand.

A third example of a hypothesis/heuristic may be a bias towards nearby states, which may be useful in remedying a situation wherein the solver module may output an incorrect solution. For example, a user may be pointing with an index finger, but the solver module may be fitting the thumb or middle finger to the extended point cloud data instead. In other cases, it may be possible that the wrong number of fingers are raised, and local attraction may not raise or lower the extra finger. Therefore, the solver module, or an additional solver module (not shown), may run an additional simulation that begins with the best fit pose from the previous frame (as discussed in further detail below), and then adds constraints to raise or lower one or more fingers into the opposite pose of where the solver module (or alternative solver module) currently thinks the one or more fingers are. In some instances, neighboring fingers may additionally be rotated.

A fourth example of a hypothesis/heuristic may be a pose classifier bias. For example, the solver module may include a naïve five finger detector. The solver module may check scan-lines of the 3D object 110 or 200, specifically the point cloud mapping 210 of the 3D object 200, for contiguous segments. When five segments come together, the solver module may assume that the top of each of the five segments is attached to a fingertip, and a physics simulation may be run by the solver module or by a physics simulator (not shown) communicatively coupled with the solver module. The solver module and/or physics simulator may identify that the hand is open, generally vertical, and palm-facing the 3D camera. Other common poses may be used in addition to, or as an alternative to, the palm-facing pose described above.

The above examples of hypothesis/heuristics are described with reference to a hand, but may be extended to other 3D objects such as a user's body, two hands, or some other type of object. In some embodiments, additional/alternative hypotheses/heuristics may be used. In some embodiments, one or more hypothesis/heuristic may be combined with another hypothesis/heuristic.

As described above, the solver module may output a solution such as solution 1 at 520 to the system of linear equations representing the pose of the 3D model 215, and the solution may be based on one or more of the constraints such as the angular constraints, the contact constraints, and/or the surface constraints identified at 500, 505, and 510, respectively. The solver module may also create additional solutions such as solution 2 (not shown) through solution n at 525 based on hypothesis/heuristic 1 through hypothesis/heuristic n−1 identified at 530 and 535, respectively, as described above.

An error analysis module such as error analysis module 142 may then calculate an error metric for each solution at 540. In embodiments, the error metric may be based on one or more segments of the 3D model, such as 3D model 215. In embodiments, the error metric may be based on the minimum distance that a segment in the 3D model 215 would have to be displaced to match the point cloud mapping 210 of the 3D object 200. This distance may be defined as the distance of the further point p in the set of point cloud point $P_i$ which are as close to the surface of the current segment $B_i$ as they are to any point on the surface H of the 3D object 200. In embodiments, a distance metric d may be defined as $d(p,Q) \equiv \min\{|p-q| | q \epsilon Q\}$ where Q may be the set of points in the point cloud (Equation 1). Using Equation 1, an error metric for an individual point $e_i$ in a segment $B_i$, $e_i(B_i)$, may be defined as $e_i(B_i) = \max\{d(p, B_i) | p \epsilon P_i\}$ (Equation 2). In embodiments, the error metric depicted in Equation 2 may be considered a "local" error metric.

As described above, the "local" error metric may be considered an error metric generated by one or more points of the 3D model 215 being a distance away from the one or more points of the point cloud mapping 210. However, in addition to generating an error metric from these points, in some embodiments an error metric may be additionally or alternatively generated based on one or more points of the 3D model 215 being in a space where the point cloud mapping 210 indicates that the 3D object 200 is not. In embodiments, a second error metric $e_r$, may be considered a ray-cast metric. Specifically, a ray-cast error for a segment, $e_r(B_i)$ may be equal to some constant value if the centroid, or geometric center, of the segment $B_i$ occludes a background portion of the point cloud mapping 210. Otherwise, the ray-cast error for the segment $e_r(B_i)$ may be equal to "0" if the centroid of the segment $B_i$ does not occlude a background portion of the point cloud mapping 210.

The total error, $e_{total}$ for a segment $B_i$, may be defined as $e_{total}(B_i) = e_i(B_i) + e_r(B_i)$. Unlike depth buffer comparisons, which may be computationally intensive, the error metric $e_{total}$ may not be symmetric. However, the error metric $e_{total}$ may be less sensitive to the number of pixels in the point cloud mapping 210, and the error metric $e_{total}$ may further indicate where the 3D model 215 corresponds to, or "fits," the 3D object 100.

In embodiments, the solver module 140 or the error analysis module 142 may then select a solution with the least error, for example the lowest error metric $e_{total}$, at 545. As described above, in some embodiments $e_{total}$ may only be an error metric for a single segment of the 3D model 215. In some embodiments, the solver module may select a least error solution at 545 based on the $e_{total}$ for only the single segment, while in other embodiments the solver module may sum the $e_{total}$ for a plurality of segments in the 3D model 215. In some embodiments, the least error solution may be selected at 545 based only on $e_t(B_i)$ for one or more segments, $e_r(B_i)$ for one or more segments, or a different error metric.

Finally, a pose of the 3D model 215 may be identified at 550. In embodiments, the pose of the 3D model 215 may be selected at 550 based at least in part on the solution with the lowest error metric $e_{total}$. In some embodiments, the selected pose may be fed back to the solver module to assist with solving for the pose of the 3D object 110 or 200 at 515 in a next frame. For example, the pose of the 3D model 205 at frame x may be used as an input to the solution for the model at frame x+1.

The process 501 described above may provide a number of benefits. For example, the process 501 may not rely on external markers or hardware to identify the 3D object or the pose of the 3D model. Additionally, the process 501 may be relatively computationally non-intensive, thereby allowing for the multiple solutions to be output at 520 and 525. The multiple solutions may allow for a "best" solution to be identified and lead to a relatively high degree of confidence in the pose identified at 550. Finally, the subsampling of the point cloud mapping 110 described above may lead to reduced data, yielding even fast convergence of the pose of the 3D model to the pose of the 3D object. The process 501 may yield additional benefits.

Figure 6:
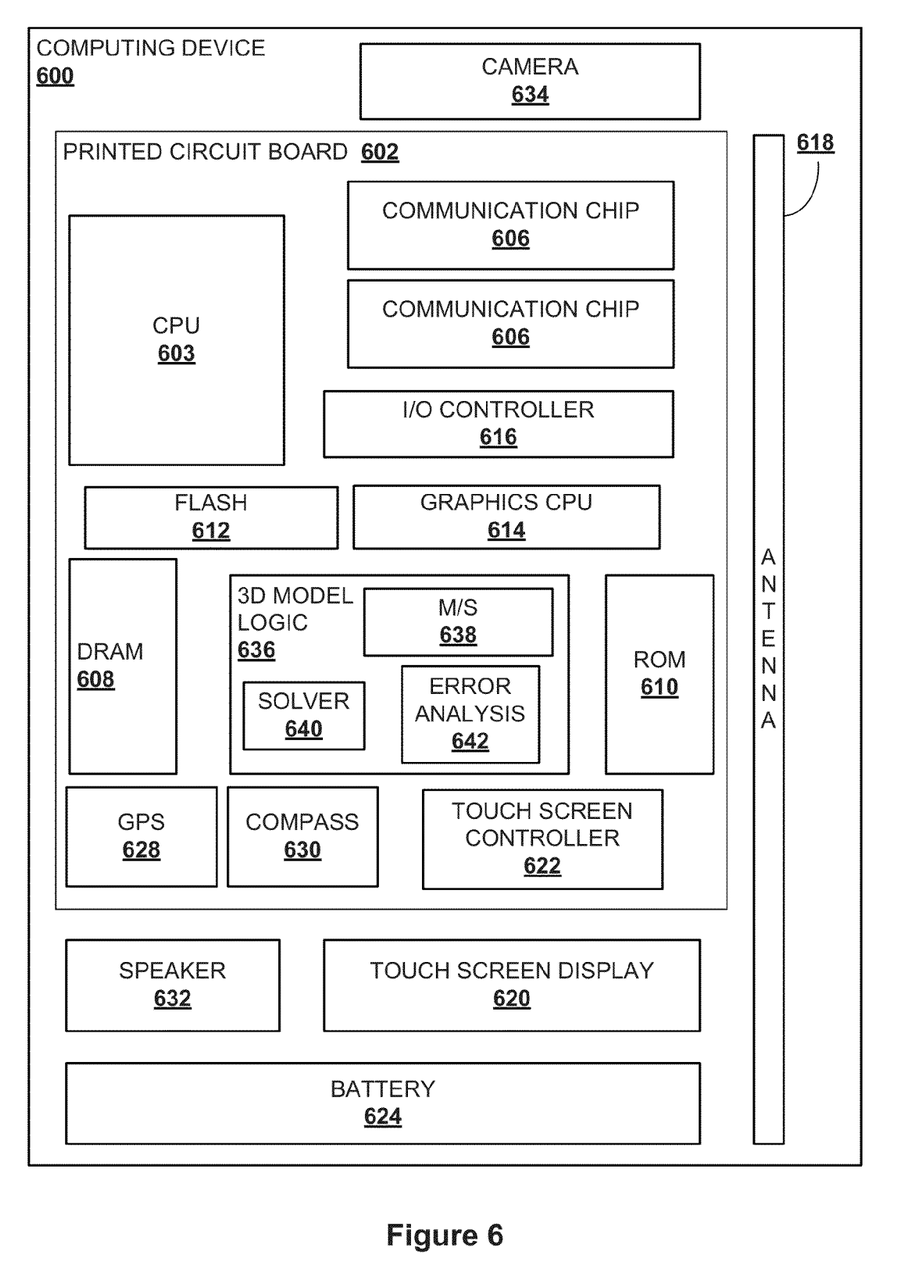
FIG. 6 depicts an example process for identifying a pose of an object, in accordance with various embodiments.

FIG. 6 illustrates an example computing device 600, in accordance with various embodiments, that may be used to capture the 3D image 205, generate the point cloud mapping 210, and or generate the 3D model 215. In some embodiments the computing device 600 may be a 3D camera such as 3D camera 105, as described above, one or more computing systems coupled with the 3D camera, or the computing device 600 may be distributed across a plurality of different physical components such as the one or more computing systems and the 3D camera.

Computing device 600 may include a number of components, plurality of processors 603 and, in some cases, one or more communication chips 606. In various embodiments, the processors 603 may be processor cores. In various embodiments, the communication chips 606 may also be physically and/or electrically coupled to the processors 603. In further implementations, the communication chips 606 may be part of processors 603. In various embodiments, computing device 600 may include printed circuit board ("PCB") 602. For these embodiments, processors 603 and communication chips 606 may be disposed thereon. In alternate embodiments, the various components may be coupled without the employment of PCB 602.

Depending on its applications, computing device 600 may include other components that may or may not be physically and electrically coupled to the PCB 602. These other components include, but are not limited to, volatile memory (e.g., dynamic random access memory 408, also referred to as "DRAM"), non-volatile memory (e.g., read only memory 610, also referred to as "ROM"), flash memory 612, a graphics processor 614, an input/output controller 616, a digital signal processor (not shown), a crypto processor (not shown), one or more antenna 618, a display (not shown), a touch screen display 620, a touch screen controller 622, a battery 624, an audio codec (not shown), a video codec (not shown), a global positioning system ("GPS") device 628, a compass 630, an accelerometer (not shown), a gyroscope (not shown), a speaker 632, a camera 634, and a mass storage device (such as hard disk drive, a solid state drive, compact disk ("CD"), digital versatile disk ("DVD")) (not shown), and so forth. In various embodiments, processors 603 may be integrated on the same die with other components to form a System on Chip ("SoC").

In embodiments, the computing device 600 may further include 3D model logic 636 which may correspond to 3D model logic 136 of FIG. 1. In some embodiments, the 3D model logic 636 may include a mapper/subsampler module 638 which may correspond to mapper/subsampler module 138. The 3D model logic 636 may further include a solver module 640 which may correspond to solver module 140 described above. The 3D model logic 636 may further include an error analysis module 642 which may correspond to error analysis module 142 described above. In some embodiments, one or more of the mapper/subsampler module 638, solver module 640, and error analysis module 642 may be implemented as hardware, software, or firmware. In some embodiments, one or more elements of the 3D model logic 636, e.g. the solver module 640 and error analysis module 642, may be combined with one another. In some embodiments, one or more elements of the 3D model logic 636, for example the mapper/subsampler module 638, may be coupled with a different element of the printed circuit board 602 such as the graphics CPU 614.

In various embodiments, volatile memory (e.g., DRAM 608), non-volatile memory (e.g., ROM 610), flash memory 612, and the mass storage device may include programming instructions configured to enable computing device 600, in response to execution by processors 603, to practice all or selected aspects of the operations depicted as described above in FIG. 5. For example, one or more of the memory components such as volatile memory (e.g., DRAM 608), non-volatile memory (e.g., ROM 610), flash memory 612, and the mass storage device may include temporal and/or persistent copies of the 3D model logic 636 implemented as firmware or software, and/or computer instructions that, when executed by the computing device 600, cause the computing device to perform the process 501 of FIG. 5. In some embodiments, the volatile memory (e.g., DRAM 608), non-volatile memory (e.g., ROM 610), flash memory 612, and the mass storage device may include one or more surface constraint(s) 115, collision/contact constraint(s) 120, and/or angular constraint(s) 125.

The communication chips 606 may enable wired and/or wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. Most of the embodiments described herein include WiFi and LTE RAT as examples. However, the communication chip 406 may implement any of a number of wireless standards or protocols, including but not limited to IEEE 802.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3G, 4G, 5G, and beyond. The computing device 400 may include a plurality of communication chips 406. For instance, a first communication chip 406 may be dedicated to shorter range wireless communications such as Wi-Fi and Bluetooth and a second communication chip 406 may be dedicated to longer range wireless communications such as GPS, EDGE, GPRS, CDMA, WiMAX, LTE, Ev-DO, and others.

In various implementations, the computing device 600 may be a laptop, a netbook, a notebook, an ultrabook, a smart phone, a computing tablet, a personal digital assistant ("PDA"), an ultra mobile PC, a mobile phone, a desktop computer, a server, an embedded computing device, a printer, a scanner, a monitor, a set-top box, an entertainment control unit (e.g., a gaming console), a digital camera, a portable music player, or a digital video recorder. In further implementations, the computing device 600 may be any other electronic device that processes data.

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 may include one or more computer readable media comprising instructions to determine a pose of a model, the instructions configured, upon execution of the instruction by the computing device, to cause the computing device to: identify a surface constraint of a pose of a model of an object, the surface constraint based at least in part on a three-dimensional (3D) image of the object; identify an additional constraint of the pose of the model of the object, wherein the additional constraint is an angular constraint of the object or a contact constraint of the object; calculate a solution of a linear equation representing the pose of the model subject to at least the surface constraint and the additional constraint; and determine a pose of the model based at least in part on the solution.

Example 2 may include the one or more computer readable media of example 1, wherein the instructions are further configured to cause the computing device to: identify a previous pose of the model; and calculate the mathematical solution based at least in part on the previous pose of the model.

Example 3 may include the one or more computer readable media of examples 1 or 2, wherein the instructions are further configured to cause the computing device to: subsample the 3D image of the object to obtain a subsampled 3D data of the object; and base the surface constraint at least in part on the subsampled 3D data of the object.

Example 4 may include the one or more computer readable media of examples 1 or 2, wherein the instructions are further configured to cause the computing device to calculate the solution of the linear equation based at least in part on a movement hypothesis of the object.

Example 5 may include the one or more computer readable media of example 4, the instructions are further configured to cause the computing device to: calculate a first solution and a second solution of the linear equation subject to the surface constraint and the additional constraint, wherein the first solution of the linear equation is based at least in part on the movement hypothesis of the object, and a second solution of the linear equation is not based at least in part on the movement hypothesis of the object; and determine the pose of the model based at least in part on the first solution and the second solution.

Example 6 may include the one or more computer readable media of example 5, wherein the model comprises a plurality of segments, and the instructions are further configured to cause the computing device to: identify a 3D segment data in the 3D data corresponding to a segment in the plurality of segments; identify a first error metric corresponding to the segment for the first solution, and identify a second error metric corresponding to the segment for the second solution; and determine the pose of the model based at least in part on a comparison of the first error metric and the second error metric.

Example 7 may include the one or more computer readable media of examples 1 or 2, wherein the model is an articulated model, the object is a hand, and the plurality of segments include a plurality of bone segments of the hand.

Example 8 may include the one or more computer readable media of examples 1 or 2, wherein the object is a hand.

Example 9 may include an apparatus to determine a pose of a model, the apparatus comprising: a memory configured to store a first constraint of a pose of a model of an object; and three-dimensional (3D) model logic coupled with the memory and configured to calculate a solution of a linear equation representing the pose of the model subject to at least the first constraint and a surface constraint of the pose of the model of the object, the surface constraint based at least in part on a 3D image of the object.

Example 10 may include the apparatus of example 9, wherein the 3D model logic is further configured to calculate an error metric of the solution based at least in part on a 3D image of the object and the solution.

Example 11 may include the apparatus of example 9, wherein the calculation logic is further configured to calculate the solution based at least in part on a starting pose of the model.

Example 12 may include the apparatus of any of examples 9-11, wherein the apparatus is a system comprising: the 3D model logic; and a 3D camera coupled with the 3D model logic and configured to capture the 3D data of the object, wherein the 3D camera is a structured light, time-of-flight, or stereoscopic 3D camera.

Example 13 may include the apparatus of examples 9-11, wherein the object is a hand, and the model includes a plurality of bone segments of the hand.

Example 14 may include a method of determining a pose of a model, the method comprising: identifying, by a computing device, a surface constraint of a pose of a model of an object, the surface constraint based at least in part on a three-dimensional (3D) image of the object; identifying, by the computing device, an additional constraint of the pose of the model of the object, wherein the additional constraint is an angular constraint of the object or a contact constraint of the object; calculating, by the computing device, a solution of a linear equation representing the pose of the model subject to at least the surface constraint and the additional constraint; and determining, by the computing device, a pose of the model based at least in part on the solution.

Example 15 may include the method of example 14, further comprising: identifying, by the computing device, a previous pose of the model; and calculating, by the computing device, the solution based at least in part on the previous pose of the model.

Example 16 may include the method of examples 14 or 15, further comprising: subsampling, by the computing device, the 3D image of the object to obtain a subsampled 3D data of the object; and basing, by the computing device, the surface constraint at least in part on the subsampled 3D data of the object.

Example 17 may include the method of examples 14 or 15, further comprising calculating, by the computing device, the solution of the linear equation based at least in part on a movement hypothesis of the object.

Example 18 may include the method of example 17, further comprising: calculating, by the computing device, a first solution and a second solution of the linear equation subject to the surface constraint and the additional constraint, wherein the first solution of the linear equation is based at least in part on the movement hypothesis of the object, and a second solution of the linear equation is not based at least in part on the movement hypothesis of the object; and determining, by the computing device, the pose of the model based at least in part on the first solution and the second solution.

Example 19 may include the method of example 18, further comprising: determining, by the computing device, a first error metric for the first solution and a second error metric for the second solution; and determining, by the computing device, the pose based at least in part on a comparison of the first error metric and the second error metric.

Example 20 may include the method of examples 14 or 15, wherein the object is a hand, and the model is an articulated model including a plurality of bone segments of the hand.

Example 21 may include an apparatus to determine a pose of a model, the apparatus comprising: means to identify a surface constraint of a pose of a model of an object, the surface constraint based at least in part on a three-dimensional (3D) image of the object; means to identify an additional constraint of the pose of the model of the object, wherein the additional constraint is an angular constraint of the object or a contact constraint of the object; means to calculate a solution of a linear equation representing the pose of the model subject to at least the surface constraint and the additional constraint; and means to determine a pose of the model based at least in part on the solution.

Example 22 may include the apparatus of example 21, further comprising: means to identify a previous pose of the model; and means to calculate the solution based at least in part on the previous pose of the model.

Example 23 may include the apparatus of examples 21 or 22, further comprising: means to subsample the 3D image of the object to obtain a subsampled 3D data of the object; and means to base the surface constraint at least in part on the subsampled 3D data of the object.

Example 24 may include the apparatus of examples 21 or 22, further comprising means to calculate the solution of the linear equation based at least in part on a movement hypothesis of the object.

Example 25 may include the apparatus of example 24, further comprising: means to calculate a first solution and a second solution of the linear equation subject to the surface constraint and the additional constraint, wherein the first solution of the linear equation is based at least in part on the movement hypothesis of the object, and a second solution of the linear equation is not based at least in part on the movement hypothesis of the object; and means to determine the pose of the model based at least in part on the first solution and the second solution.

Example 26 may include the apparatus of example 25 further comprising: means to determine a first error metric for the first solution and a second error metric for the second solution; and means to determine the pose based at least in part on a comparison of the first error metric and the second error metric.

Example 27 may include the apparatus of examples 21 or 22, wherein the object is a hand, and the model is an articulated model that includes a plurality of bone segments of the hand.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. One or more computer readable media comprising instructions configured, upon execution of the instruction by the computing device, to cause the computing device to:
   identify a surface constraint of a pose of a model of an object, the surface constraint based at least in part on a three-dimensional (3D) image of the object;
   identify an additional constraint of the pose of the model of the object, wherein the additional constraint is an angular constraint of the object or a contact constraint of the object;
   calculate a first solution and a second solution of a linear equation representing the pose of the model subject to at least the surface constraint and the additional constraint;
   identify a first error metric related to the first solution and a second error metric related to the second solution; and
   determine a pose of the model related to the first solution or the second solution based on a comparison of the first error metric and the second error metric.

2. The one or more computer readable media of claim 1, wherein the instructions are further configured to cause the computing device to:
   identify a previous pose of the model; and
   calculate the mathematical solution based at least in part on the previous pose of the model.

3. The one or more computer readable media of claim 1, wherein the instructions are further configured to cause the computing device to:
   subsample the 3D image of the object to obtain a subsampled 3D data of the object; and
   base the surface constraint at least in part on the subsampled 3D data of the object.

4. The one or more computer readable media of claim 1, wherein the instructions are further configured to cause the computing device to calculate the solution of the linear equation based at least in part on a movement hypothesis of the object.

5. The one or more computer readable media of claim 4, the instructions are further configured to cause the computing device to:
   calculate a first solution and a second solution of the linear equation subject to the surface constraint and the additional constraint, wherein the first solution of the linear equation is based at least in part on the movement hypothesis of the object, and a second solution of the linear equation is not based at least in part on the movement hypothesis of the object; and
   determine the pose of the model based at least in part on the first solution and the second solution.

6. The one or more computer readable media of claim 5, wherein the model comprises a plurality of segments, and the instructions are further configured to cause the computing device to:
   identify a 3D segment data in the 3D data corresponding to a segment in the plurality of segments, wherein the first error metric corresponds to the segment for the first solution, and the second error metric corresponds to the segment for the second solution.

7. The one or more computer readable media of claim 6, wherein the model is an articulated model, the object is a hand, and the plurality of segments include a plurality of bone segments of the hand.

8. The one or more computer readable media of claim 1, wherein the object is a hand.

9. An apparatus comprising:
   a memory configured to store a first constraint of a pose of a model of an object;
   three-dimensional (3D) model logic coupled with the memory and configured to calculate a solution of a linear equation representing the pose of the model subject to at least the first constraint and a surface constraint of the pose of the model of the object, the surface constraint based at least in part on a 3D image of the object; and
   a 3D camera coupled with the 3D model logic and configured to capture the 3D data of the object, wherein the 3D camera is a structured light, time-of-flight, or stereoscopic 3D camera.

10. The apparatus of claim 9, wherein the 3D model logic is further configured to calculate an error metric of the solution based at least in part on a 3D image of the object and the solution.

11. The apparatus of claim 9, wherein the calculation logic is further configured to calculate the solution based at least in part on a starting pose of the model.

12. The apparatus of claim 9, wherein the object is a hand, and the model includes a plurality of bone segments of the hand.

13. A method comprising:
   identifying, by a computing device, a surface constraint of a pose of a model of an object, the surface constraint based at least in part on a three-dimensional (3D) image of the object;
   identifying, by the computing device, an additional constraint of the pose of the model of the object, wherein the additional constraint is an angular constraint of the object or a contact constraint of the object;
   calculating, by the computing device, a first solution and a second solution of a linear equation representing the pose of the model subject to at least the surface constraint and the additional constraint;
   identifying, by the computing device, a first error metric related to the first solution and a second error metric related to the second solution; and
   determining, by the computing device, a pose of the model related to the first solution or the second solution based on a comparison of the first error metric and the second error metric.

14. The method of claim 13, further comprising:
   identifying, by the computing device, a previous pose of the model; and
   calculating, by the computing device, the solution based at least in part on the previous pose of the model.

15. The method of claim 13, further comprising:
   subsampling, by the computing device, the 3D image of the object to obtain a subsampled 3D data of the object; and
   basing, by the computing device, the surface constraint at least in part on the subsampled 3D data of the object.

16. The method of claim 13, further comprising calculating, by the computing device, the solution of the linear equation based at least in part on a movement hypothesis of the object.

17. The method of claim 16, further comprising:
   calculating, by the computing device, a first solution and a second solution of the linear equation subject to the surface constraint and the additional constraint, wherein the first solution of the linear equation is based at least in part on the movement hypothesis of the object, and a second solution of the linear equation is not based at least in part on the movement hypothesis of the object; and
   determining, by the computing device, the pose of the model based at least in part on the first solution and the second solution.

18. The method of claim 13, wherein the object is a hand, and the model is an articulated model including a plurality of bone segments of the hand.

* * * * *